United States Patent
Ryu et al.

(10) Patent No.: US 7,940,752 B2
(45) Date of Patent: May 10, 2011

(54) RAKE RECEPTION APPARATUS AND METHOD IN A MOBILE TERMINAL

(75) Inventors: Dong-Ryeol Ryu, Seoul (KR); Hi-Chan Moon, Yongin-si (KR); Yoo-Chang Eun, Seoul (KR)

(73) Assignee: Samsung Electronics Co., Ltd (KR)

( * ) Notice: Subject to any disclaimer, the term of this patent is extended or adjusted under 35 U.S.C. 154(b) by 469 days.

(21) Appl. No.: 11/787,014

(22) Filed: Apr. 13, 2007

(65) Prior Publication Data

US 2007/0242641 A1 Oct. 18, 2007

(30) Foreign Application Priority Data

Apr. 13, 2006 (KR) .................... 10-2006-0033707

(51) Int. Cl.
*H04L 12/60* (2006.01)
*H04Q 11/00* (2006.01)

(52) U.S. Cl. ........ 370/355; 455/130; 375/137; 375/147; 375/316; 375/347; 370/342

(58) Field of Classification Search .................. 375/148, 375/147, 144, 150, 347, 349; 370/335, 312, 370/345, 332, 320, 329, 355; 455/458, 574, 455/272, 436

See application file for complete search history.

(56) References Cited

U.S. PATENT DOCUMENTS

| | | | |
|---|---|---|---|
| 6,625,467 B2 | 9/2003 | New et al. | |
| 6,748,010 B1 | 6/2004 | Butler et al. | |
| 6,829,485 B2 | 12/2004 | Abrishamkar et al. | |
| 6,975,670 B1 | 12/2005 | Aldaz et al. | |
| 7,386,030 B2 * | 6/2008 | Asghar et al. | 375/142 |
| 2002/0006805 A1 * | 1/2002 | New et al. | 455/525 |
| 2002/0086720 A1 * | 7/2002 | Kim | 455/574 |
| 2004/0116110 A1 * | 6/2004 | Amerga et al. | 455/422.1 |
| 2004/0176147 A1 * | 9/2004 | Escalante | 455/574 |
| 2007/0060095 A1 * | 3/2007 | Subrahmanya et al. | 455/343.1 |

FOREIGN PATENT DOCUMENTS

| KR | 1020010102193 | 11/2001 |
|---|---|---|
| KR | 1020030014333 | 2/2003 |

* cited by examiner

*Primary Examiner* — Nick Corsaro
*Assistant Examiner* — Mahendra Patel
(74) *Attorney, Agent, or Firm* — The Farrell Law Firm, P.C.

(57) ABSTRACT

A rake reception apparatus for determining whether a paging channel is received in a mobile terminal using a Discontinuous Reception (DRX) mode. A searcher searches for a multi-path signal using a received signal output from a Radio Frequency (RF) part, and calculates an energy value for each hypothesis. A demodulator demodulates a Paging Indicator (PI) for a hypothesis for which an energy value calculated by the searcher exceeds a valid path threshold. A controller determines whether a paging channel is received, according to the demodulated signal output from the demodulator, and performs finger allocation using a multi-path search of the searcher if it is determined that the paging channel is transmitted.

6 Claims, 10 Drawing Sheets

RAKE RECEPTION APPARATUS AND METHOD IN A MOBILE TERMINAL

PRIORITY

This application claims priority under 35 U.S.C. §119(a) to a Korean Patent Application filed in the Korean Intellectual Property Office on Apr. 13, 2006 and assigned Serial No. 2006-33707, the contents of which are incorporated herein by reference.

BACKGROUND OF TH INVENTION

1. Field of the Invention

The present invention relates generally to a mobile communication system, and in particular, to a rake reception apparatus and method capable of reducing power consumption of a terminal in a Discontinuous Reception (DRX) mode of a mobile communication system.

2. Description of the Related Art

Mobile communication systems have evolved from the early voice-oriented service into high-speed, high-quality wireless data packet communication systems for providing data and multimedia services. In particular, a Universal Mobile Telecommunication Service (UMTS) system, the $3^{rd}$ generation (3G) mobile communication system that is based on Global System for Mobile Communications (GSM) and General Packet Radio Services (GPRS), which are European mobile communication systems and use Wideband Code Division Multiple Access (WCDMA), provides consistent services in which mobile phone or computer users can transmit packet switched text, digitalized voice or video, and multimedia data at a high rate of 2 Mbps or higher, regardless of their location.

A mobile terminal receiving communication services from the mobile communication system is characterized by mobility and portability. To maintain the mobility and portability of the mobile terminal, a rechargeable battery is used as the power supply. For such a mobile terminal, research is being conducted on methods capable of increasing a waiting time of the mobile terminal.

The major power consumption of the mobile terminal includes power consumption by, for example, a sleep current, a digital modem, a Radio Frequency (RF) Part and a Central Processing Unit (CPU). That is, to increase the waiting time of the mobile terminal, the power consumption in each of the elements should be minimized. The sleep current refers to a current that causes power consumption during a period in which the terminal receives no message. For example, the sleep current is consumed by an oscillator, a Liquid Crystal Display (LCD), a microprocessor and a power supply. Among the elements, the oscillator consumes the greatest amount of the sleep current, causing an increase in the power consumption. Therefore, the power consumption of the high-frequency oscillator should be reduced to decrease the total power consumption of the mobile terminal. In addition, to reduce the power consumption by the RF part, the time for which the RF part is turned on should be minimized.

The mobile communication system uses a DRX mode to increase the waiting time of the terminal. A DRX mode terminal wakes up from a sleep state at the position of a paging channel, provides power to a digital modem and an RF processor and performs demodulation on the paging channel. However, the DRX mode terminal returns to the sleep state if there is no paging information.

For example, in the WCDMA system, to reduce power consumption of the terminal, a base station transmits a so-called Paging Indicator (PI) signal, where the PI indicates presence/absence of a Paging CHannel (PCH) including a paging message.

FIG. 1 illustrates a timing diagram of a PI and a PCH in a conventional mobile communication system.

A terminal, while in the sleep state, demodulates a PI 110 before directly demodulating a PCH 120, to determine whether the PCH 120 is transmitted to the terminal itself, and demodulates the PCH 120 only when necessary, i.e. when the PCH 120 is transmitted thereto. Because a length of the PI 110 is much shorter than a length of the PCH 120, it is possible to minimize the time for which the terminal wakes up from the sleep state.

In the mobile communication system, the PI 110 is transmitted over a Paging Indicator CHannel (PICH). In addition, a Common PIlot CHannel (CPICH) is always transmitted over a downlink, and is used as a phase criterion for demodulation of the PICH. The CPICH and the PICH are spread with the same scrambling codes, and are multiplied by different channelization codes for their identification. Herein, because the CPICH is always multiplied by a channelization code #0, i.e. '1', a receiver has no need to separately multiply a received CPICH by a channelization code.

FIG. 2 illustrates an operation of a conventional DRX mode terminal.

A DRX mode terminal wakes up from a sleep state only at the time the PI 110 of FIG. 1 is transmitted, and then monitors the PI 110. However, because there is a high possibility that a position of a multi-path signal has changed during the sleep state, if RF power is turned on the terminal first performs a multi-path search operation 210 in a searcher in advance of detection of the PI 110 as described in FIG. 2. After the multi-path search operation, the terminal performs a finger allocation process 220 in a controller, and a PI demodulation process 230. If the RF power is turned off, the terminal performs a PCH demodulation operation 240. A detailed description of the foregoing operations will be made with reference to FIGS. 3 to 6.

In order to increase the waiting time of the terminal, it is preferable to minimize the time for which the terminal wakes up from the sleep state. In particular, because the power consumed in the RF processor greatly affects the waiting time of the terminal, there is a need to determine presence/absence of the PCH 120 through detection of the PI 110 as quickly as possible, and then turn off power of the RF processor.

In the mobile communication system, the terminal uses a rake receiver to demodulate a received signal in the multi-path environment shown in FIG. 2.

FIG. 3 illustrates a block diagram of a reception apparatus with a rake receiver in a mobile communication system. The reception apparatus includes an RF processor 310 and a rake receiver 320. The rake receiver 320 controls demodulating an RF-processed multi-path signal received from the RF processor 310. The rake receiver 320 roughly includes a searcher 321, a plurality of fingers 325-1~325-N, a combiner 327 and a controller 323.

The searcher 321 searches for multi-path signals before the PI 110 is received, and the controller 323 allocates the searched one or multiple multi-path signals to the fingers 325-1~325-N, respectively.

FIG. 4 illustrates a detailed block diagram of the searcher 321 shown in FIG. 3. Referring to FIG. 4, the searcher 321 includes a scrambling code generator 321a, a descrambler 321b, an accumulator 321c, an energy calculator 321d and a detector 321e. The scrambling code generator 321a generates a local scrambling code that is equal to the scrambling code used in a base station. The descrambler 321b correlates a received signal to the local scrambling code. In addition, the descrambler 321*b* descrambles scrambling codes having different phases with the received signal to simultaneously check several hypotheses. A phase difference of each hypothesis, i.e. a size of each hypothesis being checked, has a regular interval as shown in FIG. 5.

FIG. 5 illustrates a hypothesis check process by a searcher.

The descrambler 321*b* checks several hypotheses by changing an offset of a scrambling code. Herein, the offset of the scrambling code is referred to as a 'hypothesis'. The accumulator 321*c* accumulates output values of the descrambler 321*b* for a time corresponding to a specific length.

The energy calculator 321*d* calculates energy of a received signal using the value output from the accumulator 321*c*. The detector 321*e* detects several upper multi-path signals from the energies of received signals, output from the energy calculator 321*d*, i.e. from the energies of several hypotheses, and reports the detection result to the controller 323.

Referring back to FIG. 3, each finger 325 is allocated a position of a multi-path signal from the controller 323, performs demodulation on the multi-path signal, and delivers the demodulation result to the combiner 327. The combiner 327 combines the demodulated multi-path signals provided from the fingers 325-1~325-N, thereby increasing demodulation performance of the rake receiver.

FIG. 6 illustrates a detailed structure of each finger in the rake receiver.

Referring to FIG. 6, the finger 325 includes a scrambling code generator 325*a*, a descrambler 325*b*, a channel estimator 325*c*, a channelization code generator 325*d*, a multiplier 325*e*, an accumulator 325*f* and a channel compensator 325*g*. The scrambling code generator 325*a* generates a local scrambling code that is equal to the scrambling code used in the base station. The channelization code generator 325*d* generates a channelization code. The descrambler 325*b* descrambles the scrambling codes having different phases with the multi-path signal allocated by the controller 323. The channel estimator 325*c* estimates the current channel status for N multiple paths using the output value of the descrambler 325*b*, and outputs the channel-estimated value to the channel compensator 325*g*. At the same time, the multiplier 325*e* multiplies the output value of the descrambler 325*b* by the channelization code generated by the channelization code generator 325*d*. The accumulator 325*f* accumulates the output value of the multiplier 325*e* for a time corresponding to a specific length. The channel compensator 325*g* conjugates the channel estimation result from the channel estimator 325*c*, and complex-multiplies the conjugation result by the value accumulated in the accumulator 325*f*, thereby performing channel compensation. The channel compensator 325*g* outputs the channel-compensated value to the combiner 327.

A description will now be made of an operation of a terminal with a rake receiver in a DRX mode.

The searcher 321 searches for multi-path signals before the PI 110 is received, and the controller 323 allocates the detected one or multiple multi-path signals to the fingers 325-1~325-N, respectively. The fingers 325-1~325-N each descramble the multi-path signal with a scrambling code, separate a CPICH and a PICH using a channelization code, perform channel estimation using the CPICH and demodulate the PI 110. The demodulation results on the PI 110, output from the fingers 325-1~325-N, are delivered to the combiner 327, which combines the PI demodulation results and reports the combination result to the controller 323. The controller 323 determines from the demodulation results on the PI 110 whether there is a need to receive the PCH 120, and if not, turns off power of a digital modem and an RF part, thereby transitioning the terminal back to the sleep state.

However, the method of receiving the PI using the fingers needs to provide power to the entire rake receiver, causing an increase in the power consumption.

There is an alternative PI detection of using off-line multi-path search and off-line PI detection to reduce the power consumption. This is disclosed in U.S. Pat. No. 6,748,010 to Butler et al. and U.S. Pat. No. 6,829,485 to Abrishamkar et al. In this method, a terminal wakes up from the sleep state, turns on an RF part, stores a received signal near a PI in a buffer, turns off RF power, searches for a multi-path using the stored received signal in the RF power-off state and off-line detects the PI for the detected multi-path. Here, a correlator of a multi-path searcher is used again as a PI detection circuit.

However, in the WCDMA system, because an interval between the PI 110 and the PCH 120 is short as shown in FIG. 1, if the presence of the PCH 120 is found after the PI 110 is off-line detected, there is not enough time to turn back on the RF part and then receive the PCH 120.

SUMMARY OF THE INVENTION

An aspect of the present invention is to address at least the problems and/or disadvantages and to provide at least the advantages described below. Accordingly, an aspect of the present invention is to provide a rake reception apparatus and method for simultaneously on-line performing multi-path search and PI detection operations in a power-on state in a mobile communication system, thereby reducing a processing time.

An aspect of the present invention is to provide a rake reception apparatus and method for improving a waiting time of a DRX mode terminal in a mobile communication system.

An aspect of the present invention is to provide a rake reception apparatus and method for simultaneously on-line performing multi-path search and PI demodulation to reduce the time for which a mobile terminal wakes up from a sleep state in a mobile communication system, thereby reducing power consumption and increasing a waiting time of the mobile terminal.

According to the present invention, there is provided a rake reception apparatus for determining whether a paging channel is received in a mobile terminal using a DRX mode. The apparatus includes a searcher for searching for a multi-path signal using a received signal output from an RF, part, and calculating an energy value for each hypothesis, a demodulator for demodulating a PI for a hypothesis for which the energy value calculated by the searcher exceeds a valid path threshold, and a controller for determining whether a paging channel is received, according to the demodulated signal output from the demodulator, and performing finger allocation using a multi-path search of the searcher if it is determined that the paging channel is transmitted.

According to the present invention, there is provided a rake reception method for determining whether a paging channel is received in a mobile terminal using a DRX mode, the method including searching for a multi-path signal using a received signal output from an RF part, and calculating an energy value for each hypothesis, determining, as a valid path, a hypothesis for which the energy value calculated for each hypothesis exceeds a valid path threshold, and demodulating a PI for a hypothesis for which the energy value exceeds a threshold if it is determined that combination is possible, and determining whether a paging channel is received, according to the demodulated signal, and performing finger allocation using a multi-path search result if it is determined that the paging channel is transmitted.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for the sake of clarity and conciseness.

The present invention provides a rake reception apparatus and method for simultaneously on-line performing multi-path search and PI-demodulation in a power-on state to reduce the time for which a mobile terminal wakes up a sleep state in a mobile communication system, thereby reducing power consumption and increasing a waiting time of the mobile terminal.

To this end, the present invention adds a PI demodulator to the existing rake receiver. The PI demodulator is constructed so as to demodulate a PI as soon as multi-path search is performed, thereby reducing the time for which the terminal wakes up from the sleep state.

Figure 1:
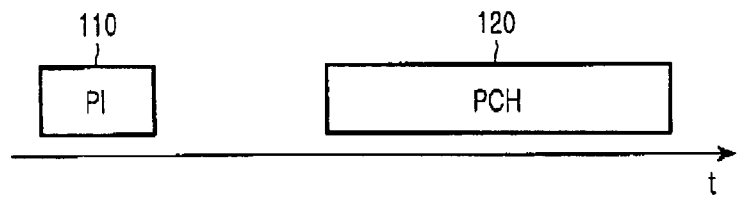
FIG. 1 illustrates a timing diagram of a PI and a PCH in a conventional mobile communication system.
Figure 2:
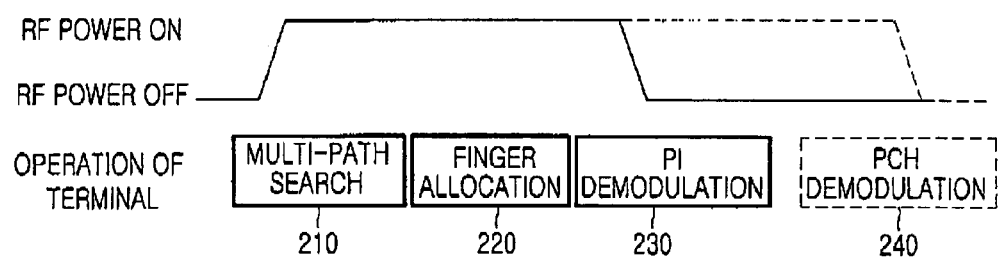
FIG. 2 illustrates an operation of a conventional DRX mode terminal.
Figure 3:
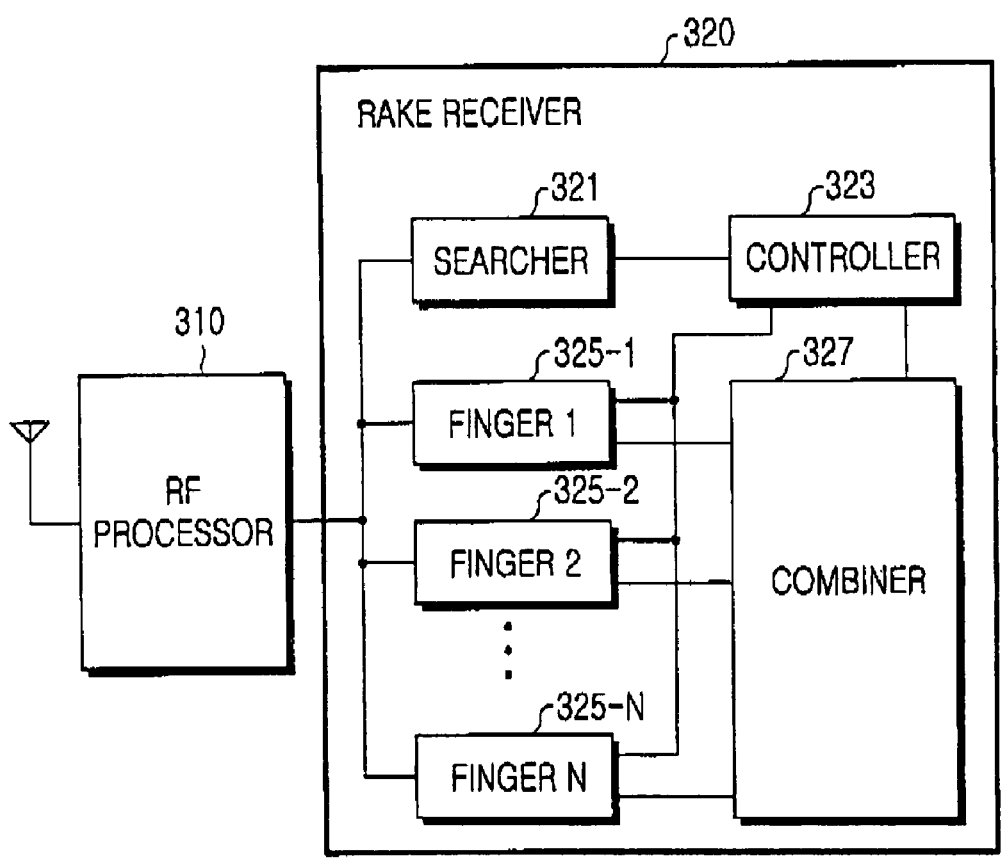
FIG. 3 illustrates a block diagram of a reception apparatus with a rake receiver in a mobile communication system.
Figure 4:
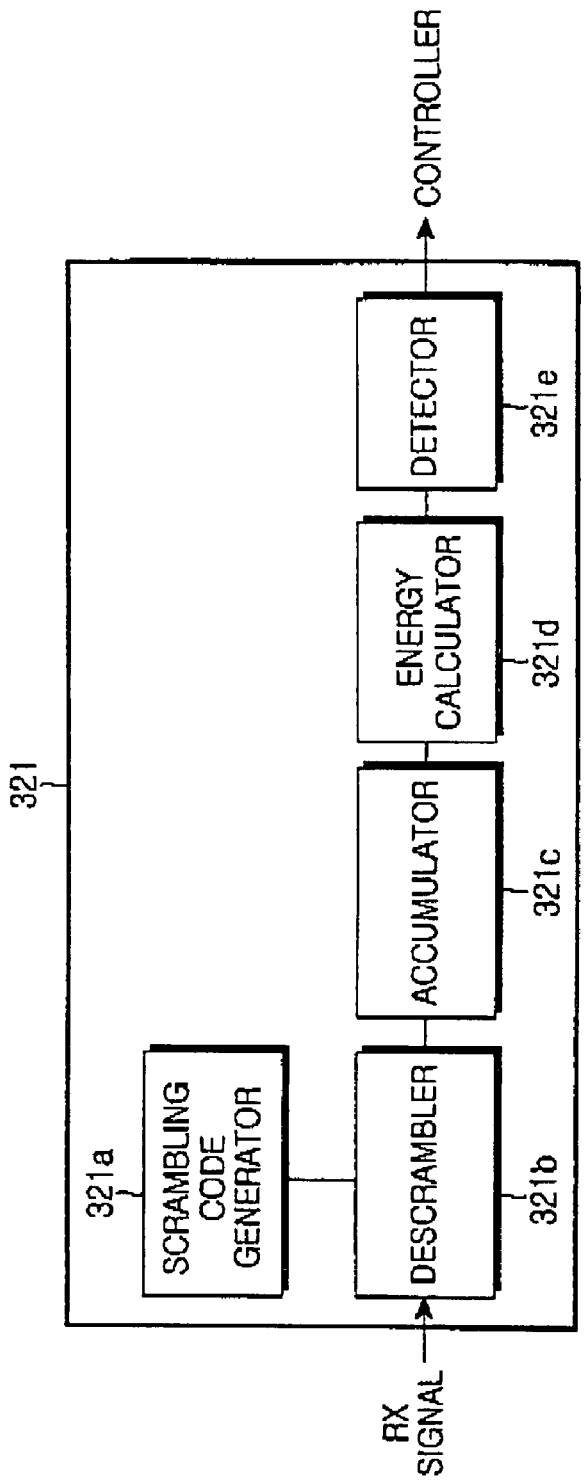
FIG. 4 illustrates a detailed block diagram of the searcher shown in FIG. 3.
Figure 5:
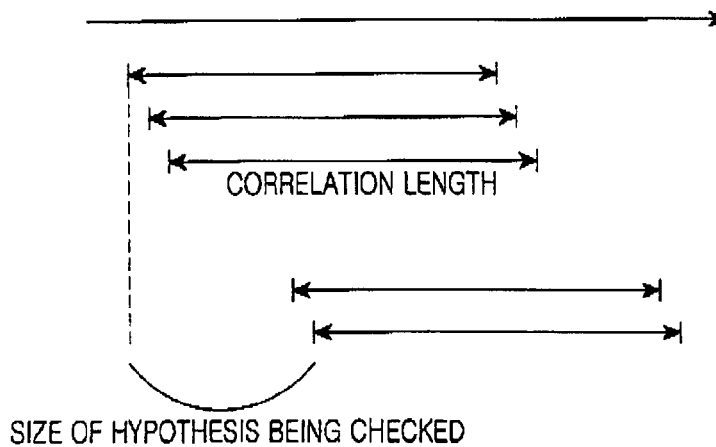
FIG. 5 illustrates a hypothesis check process by a searcher.
Figure 6:
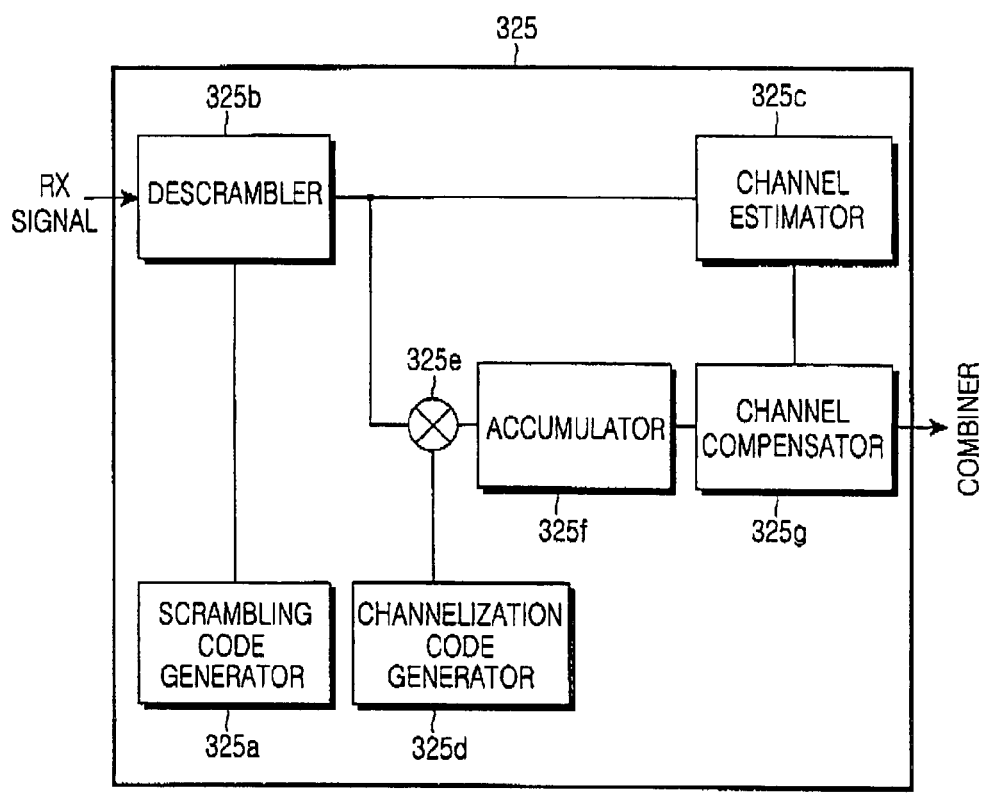
FIG. 6 illustrates a detailed structure of each finger in the rake receiver.
Figure 7:
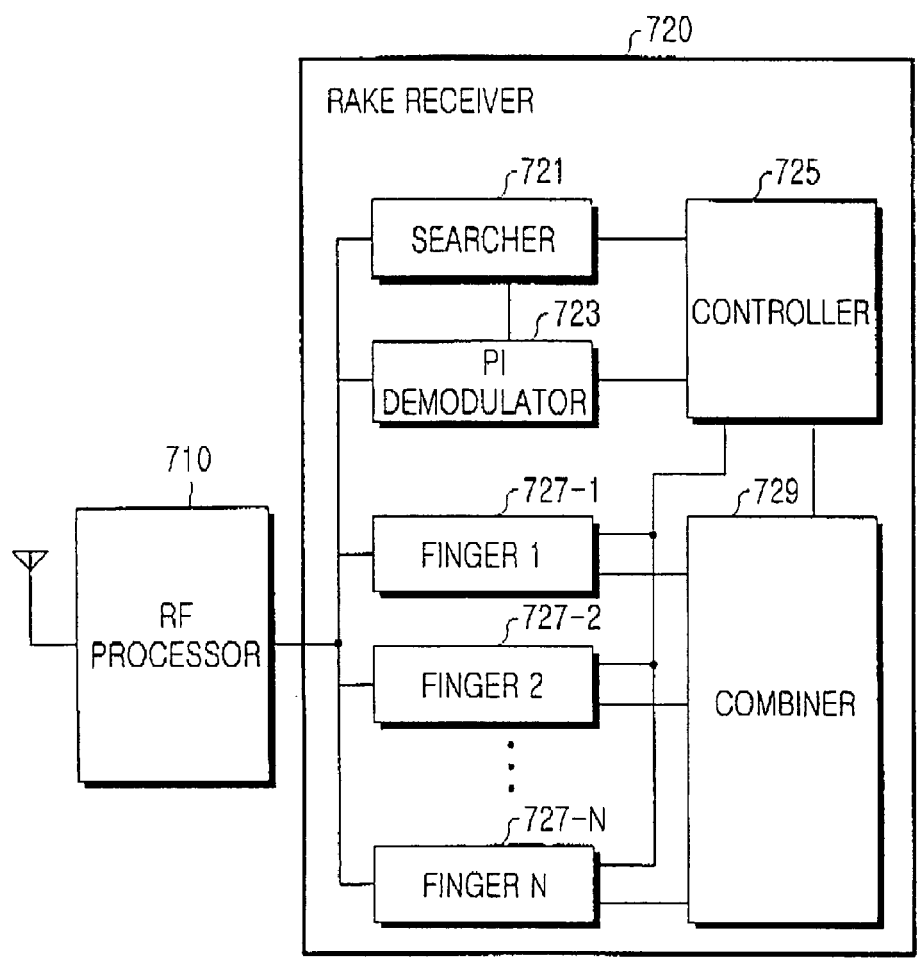
FIG. 7 illustrates a block diagram of a rake reception apparatus in a mobile communication system according to the present invention.

FIG. 7 illustrates a block diagram of a rake reception apparatus in a mobile communication system according to the present invention.

Referring to FIG. 7, the rake reception apparatus includes an RF processor 710 and a rake receiver 720.

The rake receiver 720 controls demodulating an RF-processed multi-path signal received from the RF processor 710. The rake receiver 720 roughly includes a searcher 721, a PI demodulator 723, a plurality of fingers 727-1~727-N, a controller 725 and a combiner 729.

Figure 9:
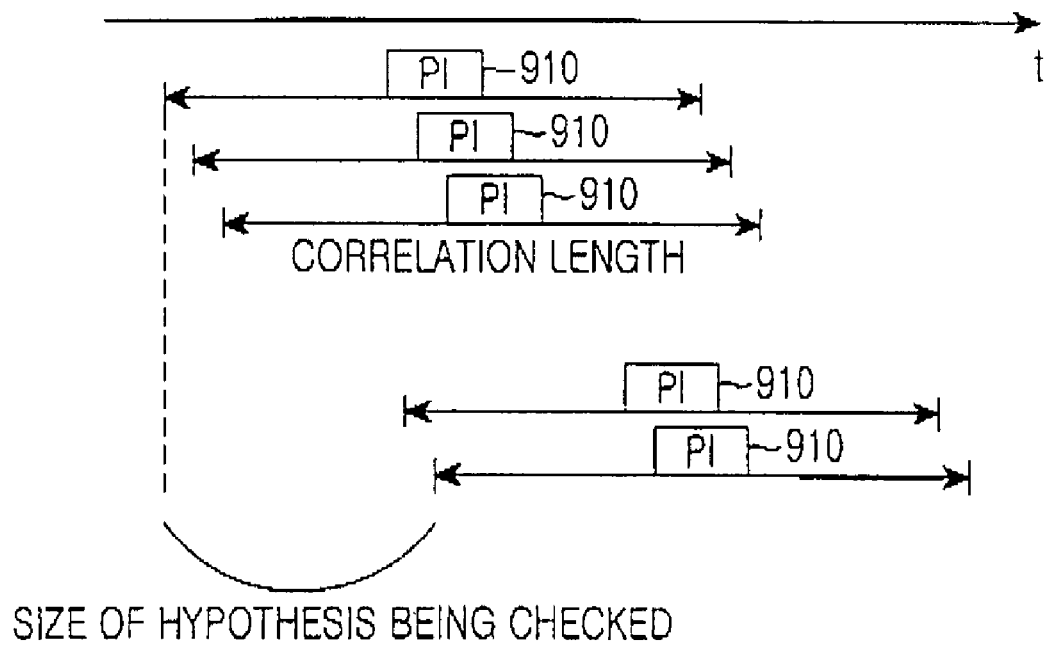
FIG. 9 illustrates a hypothesis checking process by a searcher to which the present invention is applicable.

The searcher 721 simultaneously checks several hypotheses to increase a detection speed of a multi-path signal. For each hypothesis, a local scrambling code has a different phase difference with respect to a received signal, and the phase difference of each hypothesis, i.e. a size of the hypothesis being checked, has a regular interval as shown in FIG. 9. A phase of a scrambling code used for check of each hypothesis is determined by the controller 725.

Figure 8:
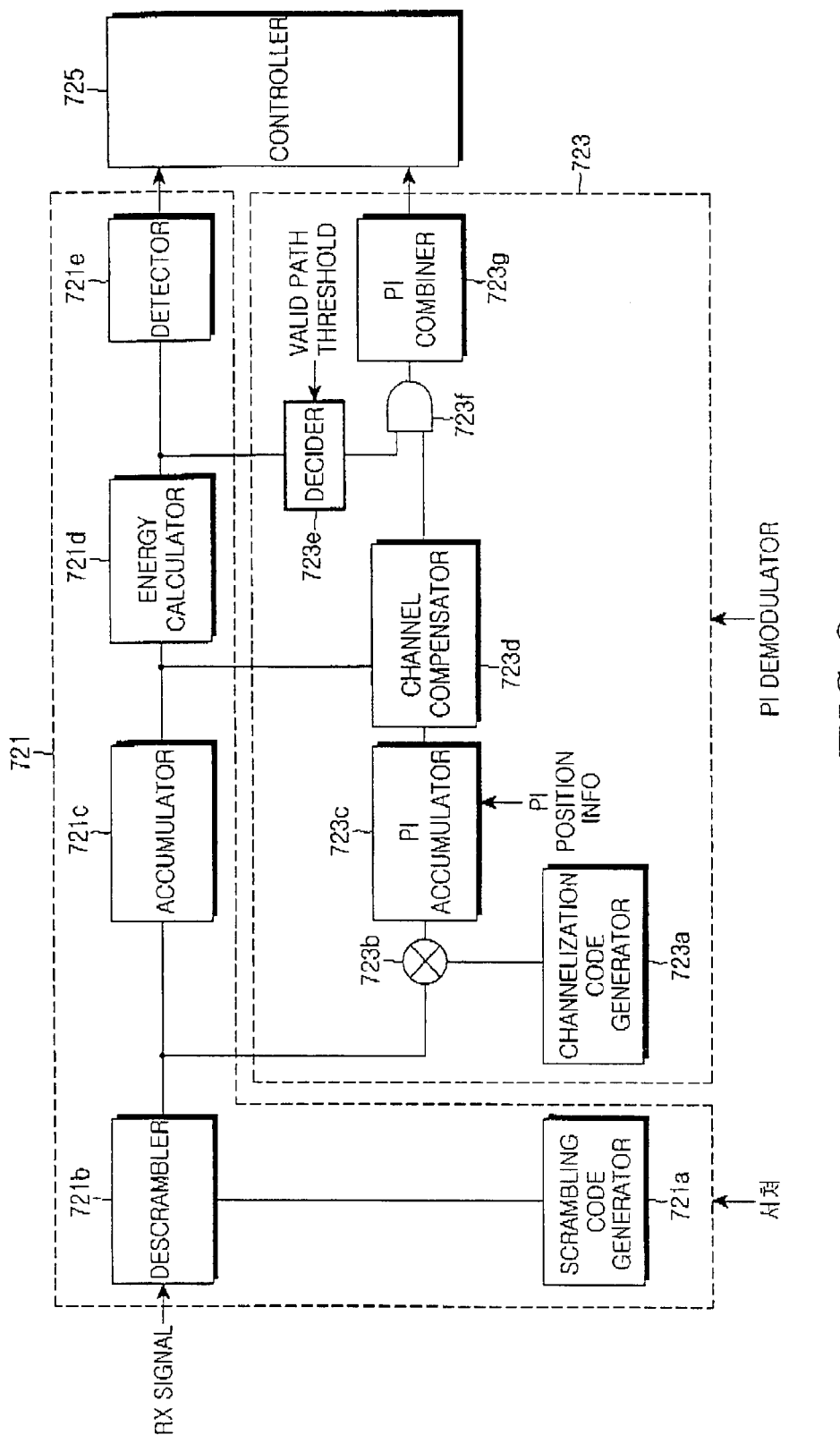
FIG. 8 illustrates a block diagram of a PI demodulator according to a first embodiment of the present invention.

FIG. 8 illustrates a block diagram of a PI demodulator according to a first embodiment of the present invention.

The searcher 721, as shown in FIG. 8, includes a channelization code generator 721a, a descrambler 721b, an accumulator 721c, an energy calculator 721d and a detector 721e.

The channelization code generator 721a generates a channelization code. The descrambler 721b descrambles scrambling codes having different phases with an allocated multi-path signal. That is, the descrambler 721b correlates a received signal to the local scrambling code. The accumulator 721c accumulates the descrambled signal for a time corresponding to a specific length, for multi-path detection. The energy calculator 721d calculates energy using the value complex-accumulated by the accumulator 721c. As shown in FIG. 9, a PI 910 is included in a correlation interval of each hypothesis checked by the searcher 721, and energy is calculated from the value accumulated for the correlation interval. The output value of the energy calculator 721d is provided to the detector 721e and a decider 723e. The detector 721e detects several upper multi-path signals from the energy values of several hypotheses, received from the energy calculator 721d, and reports the detected multi-path signals to the controller 725.

The PI demodulator 723 multiplies and accumulates a channelization code of a PICH for an interval where a PI is located, for every hypothesis being checked by the searcher 721. Because the value accumulated for each hypothesis in the searcher 721 includes phase information of a CPICH, the PI demodulator 723 performs channel compensation by multiplying the accumulated value by the corresponding accumulated PI value. Assuming that a multi-path signal has a time delay corresponding to each hypothesis, the channel-compensated value is a PI value synch-demodulated in the corresponding path. However, it cannot be known whether the multi-path signal actually exists in the position where the hypothesis appears. Therefore, it is preferable to combine the corresponding demodulated PI values only for the hypotheses that are determined to have multi-path signals.

The PI demodulator 723 includes a channelization code generator 723a, a multiplier 723b, a PI accumulator 723c, a channel compensator 723d, a decider 723e, an adder 723f, and a PI combiner 723g.

In the PI demodulator 723, the channelization code generator 723a generates a channelization code. The multiplier 723b multiplies the signal descrambled by the descrambler 721b in the searcher 721 by the channelization code output from the channelization code generator 723a. The multiplier 723b multiplies scrambling codes having different phases by the received signal to simultaneously check several time hypotheses, and a phase difference of each hypothesis has a regular interval as shown in FIG. 9. That is, for each hypothesis, a local scrambling code has a phase difference with respect to the received signal, and a phase difference of each hypothesis has a regular interval.

FIG. 9 illustrates a hypothesis checking process by a searcher to which the present invention is applicable.

A phase of a scrambling code used for check of each hypothesis is determined by the controller 725. As shown in FIG. 9, a PI 910 is included in a correlation interval of each hypothesis being checked by the searcher 721, and energy is calculated from the value accumulated for the correlation interval.

In FIG. 8, the PI accumulator 723c receives location information of a PI in a correlation interval of each hypothesis being checked by the searcher 721, and accumulates a signal in the PI interval.

The channel compensator 723d performs synch demodulation on the PI using the accumulation result on a CPICH in the accumulator 721c included in the searcher 721 and the accumulation result of the PI accumulator 723c. That is, because the value accumulated for each hypothesis in the searcher 721 includes phase information of the CPICH, the channel compensator 723d performs channel compensation by multiplying the accumulated value by the corresponding accumulated PI value. Assuming that a multi-path signal has a time delay corresponding to each hypothesis, the channel-compensated value is a PI value synch-demodulated in the corresponding path.

The decider 723e determines validity of the currently checked path by applying a threshold to the energy for each hypothesis, calculated in the searcher 721. The decider 723e determines, as a valid path, only the hypothesis having energy exceeding a valid path threshold, and allows the PI combiner 723g to combine the corresponding demodulated PI. The threshold is set by the controller 725.

The PI combiner 723g combines the PI demodulation results only when the valid path is determined.

The controller 725 controls the searcher 721 to check several hypotheses (phases) using the signals in the adjacent time interval where the PI is located. The controller 725 provides location information of the PI in a correlation interval of each hypothesis being checked by the searcher 721, to the PI accumulator 723c, and determines whether a paging channel is received, depending on a report on the combination result of the PI combiner 723g.

Figure 10:
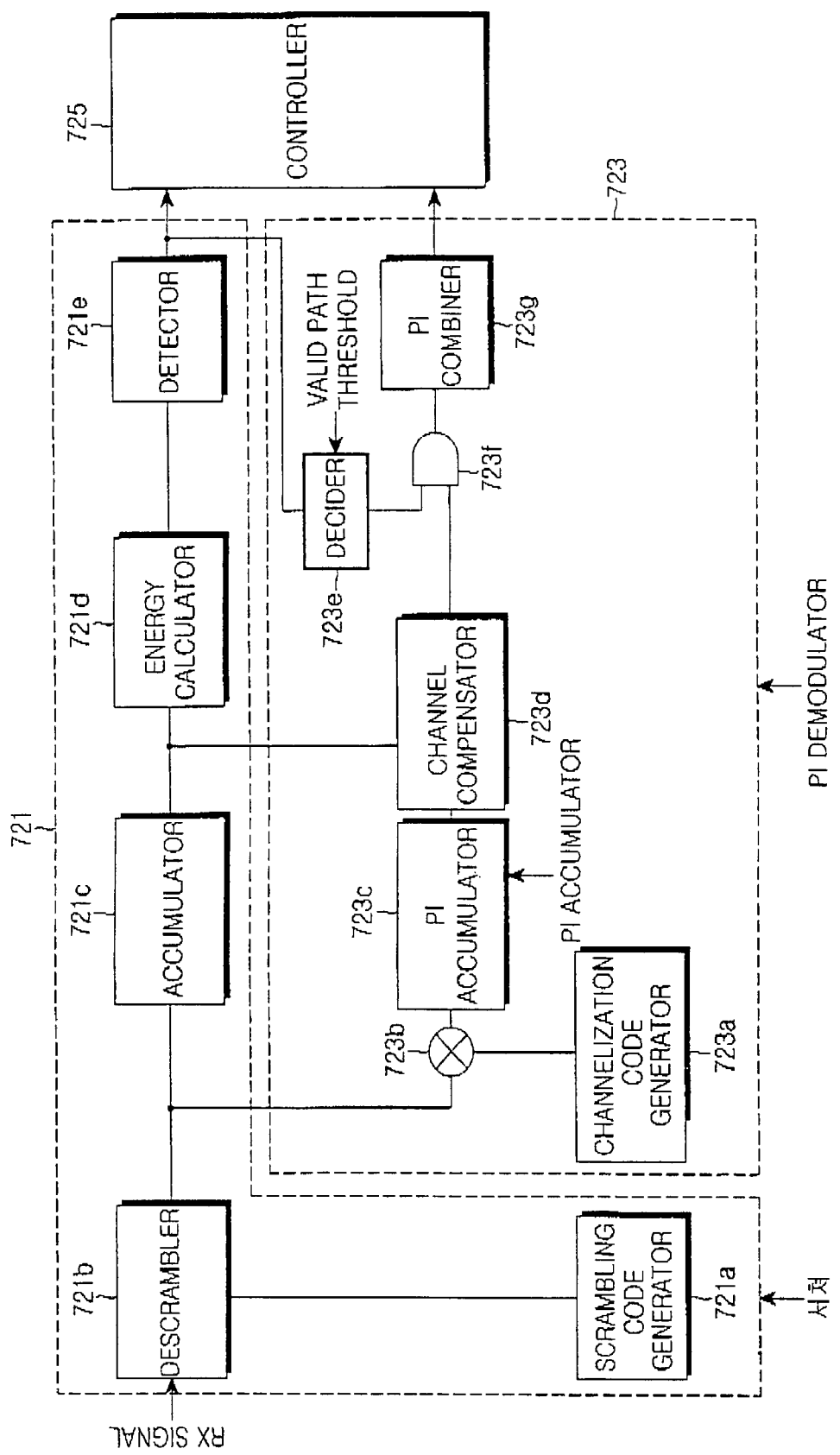
FIG. 10 illustrates a block diagram of a PI demodulator according to a second embodiment of the present invention.

FIG. 10 illustrates a block diagram of a PI demodulator according to a second embodiment of the present invention.

According to the second embodiment of the present invention, as shown in FIG. 10, validity decision of a path for PI demodulation depends on the result of the detector 721e in the searcher 721.

The detector 721e detects multi-path signals using the energy values of several hypotheses, received from the energy calculator 721d, and reports the detected multi-path signals to the controller 725.

If several upper multi-path signals detected by the detector 721e exceed a threshold determined by the controller 725, the detector 721e directly delivers the detected multi-path signals to the decider 723e in the PI demodulator 723 regardless of the report to the controller 725.

The decider 723e, shown in FIG. 10, determines validity of the currently checked path by applying a threshold to the energy for each hypothesis, detected as several upper values by the detector 721e in the searcher 721. That is, the decider 723e allows the PI combiner 723g to combine the corresponding demodulated PI values only for the hypotheses having energies exceeding the corresponding threshold. The threshold is set by the controller 725.

Therefore, because the multi-path search result is directly delivered to the PI demodulator, the multi-path search and PI detection operations can be simultaneously performed.

The controller 725 receives a report on the result obtained by combining only the accumulated PI values of the hypotheses which are determined to be valid as a multi-path signal, from the PI combiner 723g, and determines whether a PCH is received, from the result. If it is determined that a PCH is transmitted to the terminal, the controller 725 performs finger allocation using the multi-path detection result of the searcher 721, allows the rake receiver 720 to receive the PCH, and returns back to the sleep state if it is determined that the PCH is not transmitted.

Figure 11:
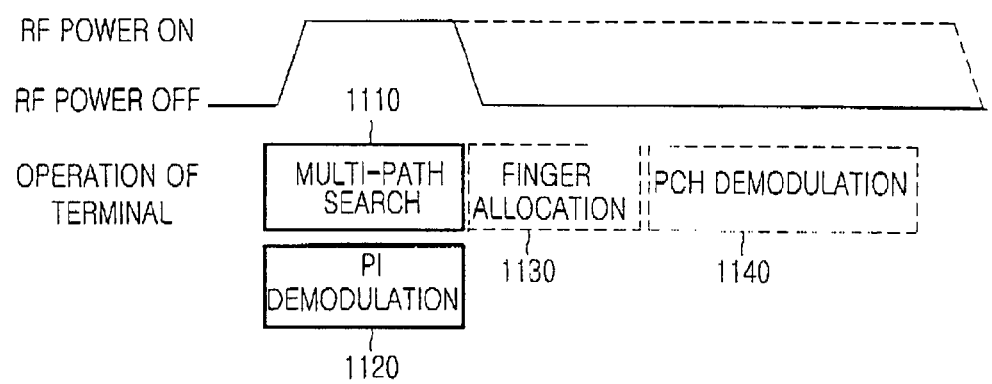
FIG. 11 illustrates an operation of a DRX mode terminal to which the present invention is applicable.

FIG. 11 illustrates an operation of a DRX mode terminal to which the present invention is applicable.

The DRX mode terminal wakes up from the sleep state only at the time the PI is transmitted, and then monitors the PI. However, because there is a high possibility that a position of a multi-path signal has changed during the sleep state, the terminal, if RF power is turned on, simultaneously performs a multi-path search operation 1110 and a PI demodulation operation 1120 in a searcher in advance of PI detection. After simultaneously performing the multi-path search operation 1110 and the PI demodulation operation 1120, the terminal performs a finger allocation operation 1130 and a PCH demodulation operation 1140 after its RF power is turned off.

Figure 12:
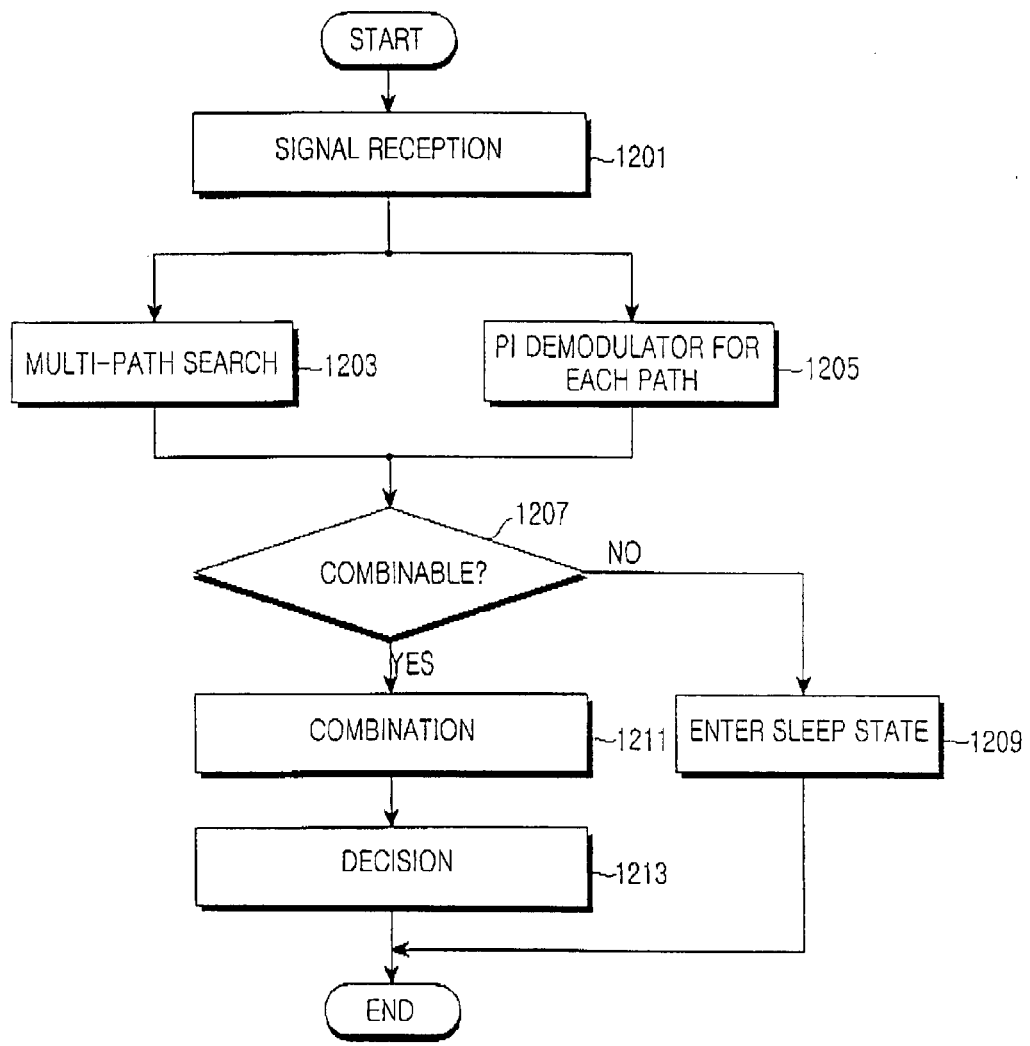
FIG. 12 illustrates a rake reception method in a mobile communication system according to the present invention.

FIG. 12 illustrates a rake reception method in a mobile communication system according to the present invention.

Referring to FIG. 12, the rake receiver 720 receives a signal through the RF processor 710 in step 1201. The rake receiver 720 simultaneously performs the following two operations.

The searcher 721 performs a multi-path search operation in step 1203. At the same time, the PI demodulator 723 performs a PI demodulation operation for each path in step 1205.

The decider 723e in the PI demodulator 723 determines in step 1207 validity of the currently checked path by applying a threshold to the energy value for each hypothesis, calculated by energy calculator 721d in the searcher 721, as described in the first embodiment of the present invention. The possibility of combination in the PI combiner 723g is determined depending on the validity decision.

In addition, the decider 723e in the PI demodulator 723 determines in step 1207 the possibility of the currently checked path by applying a threshold to the energy for each hypothesis, detected as several upper values by the detector 721e in the searcher 721, as described in the second embodiment of the present invention.

If it is determined that combination is impossible, since there is no paging information for the terminal the controller 725, turns off in step 1209 the digital modem and the RF part and returns to the sleep state. However, if the combination is possible, the PI combiner 723g combines the corresponding demodulated PI values only for the hypothesis having the energy exceeding a threshold. The threshold is set by the controller 725.

The controller 725 receives in step 1213 a report on the result obtained by combining only the accumulated PI values of the hypotheses which are determined to be valid as a multi-path signal, from the PI combiner 723g, and determines whether a PCH is received, from the result. If it is determined that a PCH is transmitted to the terminal, the controller 725 performs finger allocation using the multi-path detection result of the searcher 721, and allows the rake receiver 720 to receive the PCH.

As is apparent from the foregoing description, because the multi-path search result is immediately delivered to the PI demodulator, the multi-path search and PI detection operations can be simultaneously performed.

In addition, the DRX mode terminal can simultaneously performs multi-path search and PI detection after waking up from the sleep state and providing power to the RF processor, thereby avoiding the finger allocation operation necessary for the PI detection and thus reducing the interval for which the RF processor should be powered on.

Further, because operations of the fingers and the combiner in the rake receiver are not needed for PI demodulation, both the power necessary for signal processing of the RF processor and the power necessary for digital signal process of the modem are reduced, thus contributing to an increase in a waiting time of the terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A rake reception apparatus for determining whether a paging channel is received in a mobile terminal using a Discontinuous Reception (DRX) mode, the apparatus comprising:
   a searcher for searching for a multi-path signal using a received signal output from a Radio Frequency (RF) part, and calculating an energy value for each of a plurality of hypotheses;
   a demodulator for demodulating a Paging Indicator (PI) for a hypothesis for which an energy value calculated by the searcher exceeds a valid path threshold; and
   a controller for determining whether a paging channel is received, according to the demodulated signal output from the demodulator, and performing finger allocation using a multi-path search of the searcher if it is determined that the paging channel is transmitted, wherein the demodulator demodulates a PI for each path while searching for the multi-path signal,
   wherein the demodulator further comprises:
   a channelization code generator for generating a channelization code;
   a multiplier for multiplying an interval in which a PI is located, by the channelization code output from the channelization code generator, for every hypothesis being checked by the searcher;
   a PI accumulator for receiving PI information in a correlation interval of each hypothesis being checked by the searcher, and accumulating a signal in a PI interval;
   a channel compensator for performing channel compensation by multiplying the value accumulated for each hypothesis in the searcher by the accumulated PI value output from the PI accumulator;
   a decider for determining, as a valid path, a hypothesis for which an energy value for each hypothesis, calculated by the searcher, exceeds a valid path threshold; and
   a PI combiner for determining whether combination is possible depending on the validity determination of the decider, and performing combination on a hypothesis having an energy value exceeding a threshold, if combination is possible.

2. The rake reception apparatus of claim 1, wherein the demodulator demodulates a PI, for a hypothesis for which an energy value for each of the hypotheses, detected as several upper values by the searcher, exceeds a valid path threshold.

3. The rake reception apparatus of claim 1, wherein the decider determines, as a valid path, a hypothesis for which an energy value for each hypothesis, detected as several upper values by the searcher, exceeds a valid path threshold.

4. The rake reception apparatus of claim 1, wherein the controller transitions to a sleep state if it is determined that the paging channel is not transmitted.

5. The rake reception apparatus of claim 1, wherein the controller performs finger allocation and PI demodulation operations after the RF part of the terminal is powered off.

6. A rake reception method for determining whether a paging channel is received in a mobile terminal using a Discontinuous Reception (DRX) mode, the method comprising:
   searching for a multi-path signal using a received signal output from a Radio Frequency (RF) part, and calculating an energy value for each of a plurality of hypotheses;
   determining, as a valid path, a hypothesis for which an energy value calculated for each hypothesis exceeds a valid path threshold, and demodulating, by a demodulator, a Paging Indicator (PI) for a hypothesis for which the energy value exceeds a threshold if it is determined that combination is possible; and
   determining whether a paging channel is received, according to the demodulated signal, and performing finger allocation using a multi-path search result if it is determined that the paging channel is transmitted,
   wherein the PI demodulation is performed while the multi-path signal is searched,
   wherein the demodulator further comprises:
   a channelization code generator for generating a channelization code;
   a multiplier for multiplying an interval in which a PI is located, by the channelization code output from the channelization code generator, for every hypothesis being checked by a searcher;
   a PI accumulator for receiving PI information in a correlation interval of each hypothesis being checked by the searcher, and accumulating a signal in a PI interval;
   a channel compensator for performing channel compensation by multiplying the value accumulated for each hypothesis in the searcher by the accumulated PI value output from the PI accumulator;
   a decider for determining, as a valid path, a hypothesis for which an energy value for each hypothesis, calculated by the searcher, exceeds a valid path threshold; and
   a PI combiner for determining whether combination is possible depending on the validity determination of the decider, and performing combination on a hypothesis having an energy value exceeding a threshold, if combination is possible.

* * * * *